United States Patent [19]

Brody

[11] 4,118,979
[45] Oct. 10, 1978

[54] THERMAL ENERGY METER
[76] Inventor: Mitchell D. Brody, 77 Gibbs St., Brookline, Mass. 02146
[21] Appl. No.: 801,922
[22] Filed: May 31, 1977
[51] Int. Cl.² .......................................... G01K 17/14
[52] U.S. Cl. ................................................ 73/193 R
[58] Field of Search ............................. 73/193 R, 233
[56] References Cited

U.S. PATENT DOCUMENTS

| 3,012,435 | 12/1961 | Brising | 73/193 |
| 3,639,737 | 2/1972 | McKee | 73/193 |
| 3,733,896 | 5/1973 | Soya et al. | 73/193 |
| 3,812,713 | 5/1974 | Karlsson | 73/193 |

FOREIGN PATENT DOCUMENTS

| 721,833 | 3/1932 | France | 73/193 |
| 863,464 | 4/1941 | France | 73/193 |
| 885,708 | 12/1961 | United Kingdom | 73/193 |

OTHER PUBLICATIONS

Friedl et al., "A New Resistance to Frequency Converter for Temperature Measurements in Calorimeter" in IEEE Transaction on Inst. & Meas. vol. 1M24, #4, pp. 322-324, 12/75.

Primary Examiner—Herbert Goldstein
Attorney, Agent, or Firm—Wolf, Greenfield & Sacks

[57] ABSTRACT

A fluid substance which is heated or cooled and then transported has associated with it a well-defined transfer of thermal energy. The present invention relates to means of measuring and registering the accumulated quantity of this transfer of thermal energy associated with a moving fluid which experiences a change in temperature.

8 Claims, 6 Drawing Figures

THERMAL ENERGY METER

BACKGROUND OF THE INVENTION

Meters which measure and register the accumulated flow of fluids by volume or by mass are well known. Likewise, various devices which measure the transmission rate of mechanical and electrical energy are in use. For registering the accumulated electrical energy flow, integrating watt-meters—watt-hour meters—are commonplace items. The present invention relates to means for measuring the accumulated flow of transported thermal energy for use in a manner similar to that of an electrical watt-hour meter, but associated with the volumetric flow of fluid subjected to a temperature change.

Such a thermal energy meter is a desirable device. Fluid flow meters such as water meters are widely employed to measure the transmission of water and to enable accurate billing or accounting to be rendered. In many cases, heated or chilled water is being transmitted, and in such cases the value of the thermal energy involved may be comparable to or may exceed the value of the water itself. A thermal energy meter is especially valuable when the fluid is part of a closed system and serves only as a medium for heat transmission or exchange. In this case, the only net flow is the flow of thermal energy itself, and the energy is the only extensive quantity which can be meaningfully metered.

SUMMARY OF THE INVENTION

Accumulated energy may be measured as the time integral of power. Power, in turn, equals the product of two physical variables, one of which is a measure of the kinetic (moving) energy of a system, and the other of which is a measure of the related potential (static) energy of the same system. For example, the steady-state power delivered to a moving vehicle equals the product of its velocity (a kinetic variable) and the force (the related potential variable) needed to overcome the drag at that velocity. As another example, electric power into or out of a system equals the product of current (a kinetic variable) and the voltage difference (the related potential variable) across the system. In the case of thermal energy, the transmitted thermal power into or out of a system equals the product of the specific heat flow (a kinetic variable) and the temperature difference (the related potential variable) across the system. The specific heat flow is very closely approximated by the fluid's volumetric flow, $F$, multiplied by a constant, $H_v$, provided that the temperature (and for a gas, the pressure) range is limited. Consequently, the thermal power into or out of a system is given by $P_T$, where:

$$P_T = H_v F \Delta T \quad (1)$$

where $\Delta T$ is the temperature difference across the system. Such a system might be, for example, a water heater or chiller, or an air conditioning system.

Accumulated transferred thermal energy, $E_T$, into or out of the system is therefore the time integral:

$$E_T = H_v \int F \Delta T \, dt \quad (2)$$

where $H_v$ is allowed to be taken as a constant.

The present invention relates to means for evaluating and registering the accumulated transferred thermal energy, $E_T$, as defined by equation (2).

The independent variables of equation (2) may be registered electrically by transducers now available and input into circuitry which directly implements the block diagram as shown in FIG. 1. Circuits may be analog or digital, with suitable converters.

A circuit which directly implements the block diagram as shown in FIG. 1 may be an expensive means of evaluating equation (2) since accurate, drift-free electronic integration requires special circuitry. Furthermore, accurate transducers, power supplies, and other equipment to implement such a thermal energy meter electronically may add significantly to its cost and detract from its reliability. While it is desirable to be able to implement a thermal energy meter electronically because of the ease of making remote or automated readings, it will be valuable to overcome the limitations of a straightforward implementation of a circuit to evaluate equation (2), such as that shown in block diagram form in FIG. 1. In addition, it may be desirable to produce a thermal energy meter which requires no electricity for its operation. The present invention relates to means for implementing a thermal energy meter without these limitations.

OBJECTS OF THE INVENTION

It is therefore an object of the present invention to provide means for making a meter to accurately measure and register the accumulated flow of thermal energy associated with the transport of a fluid which experiences a change in temperature.

It is a further object of the present invention to provide means for making a thermal energy meter of low cost and high reliability.

It is an additional object of the present invention to provide means for making a thermal energy meter which may employ a variety of technologies in its construction: thermo-mechanical, thermo-electric, or thermo-electro-mechanical.

DETAILED DESCRIPTION

Figure 1:
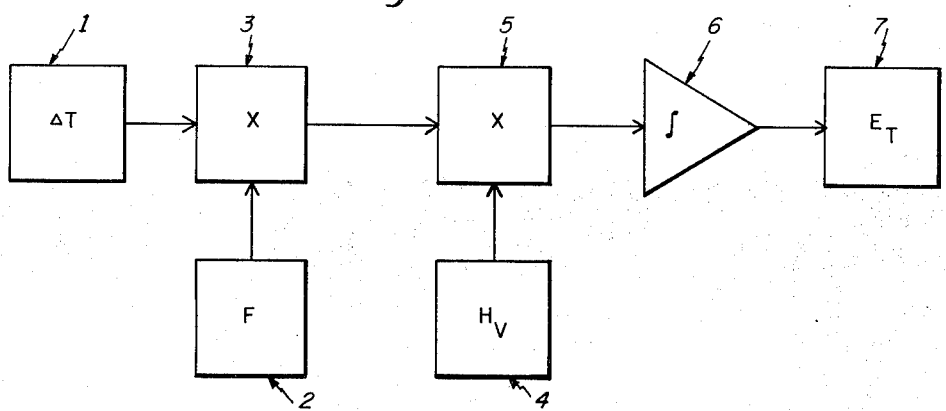
FIG. 1 is a block diagram which illustrates how the accumulated flow of thermal energy may be measured and registered, by the evaluation of equation (2).

As mentioned, an object of the present invention is to provide means for a meter which measures and registers the accumulated thermal energy transport associated with a moving fluid subjected to a temperature change. FIG. 1 illustrates how this is done in basic terms to evaluate equation (2): Temperature Transducer 1 inputs a value proportional to the temperature difference $\Delta T$ across the system which is experienced by the moving fluid, while Flow Transducer 2 inputs a value proportional to the volumetric flow of the fluid through the system. Multiplier 3 outputs a value proportional to their product. This output is proportional to the rate of transfer of thermal energy, or thermal power $P_T$. A suitable constant source 4 inputs the proper coefficient $H_v$ which when multiplied by Multiplier 5 and time integrated by Integrator 6 outputs for Register/Display 7 the accumulated value of the transferred thermal energy in convenient units. These units may be, for example, BTU's or equivalent Kilowatt-Hours.

Figure 2:
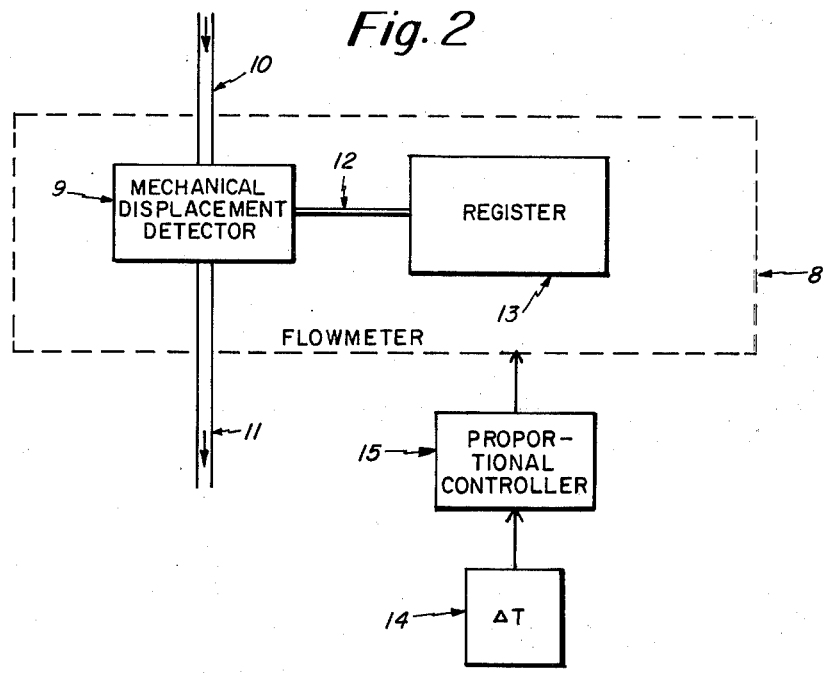
FIG. 2 is a block diagram of an alternative means of evaluating equation (2) utilizing a modified fluid flowmetering device.
Figure 3A:
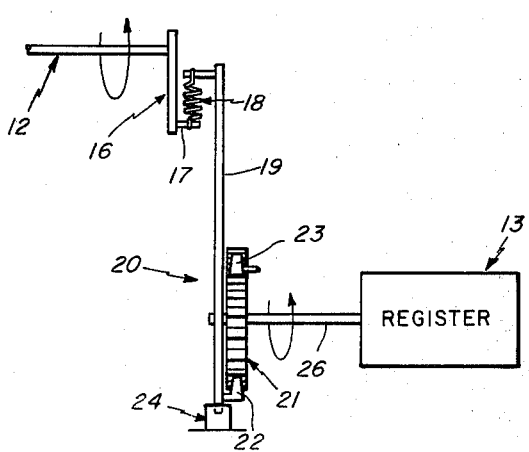
FIG. 3A and FIG. 3B are mechanical schematic diagrams showing a purely mechanical means by which a portion of the block diagram of FIG. 2 may be implemented.
Figure 3B:
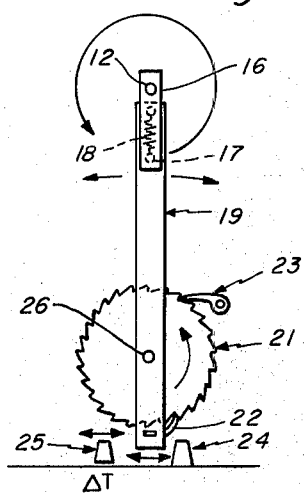
Figure 4:
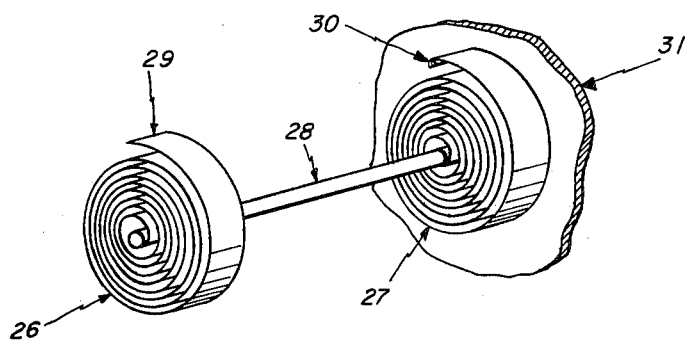
FIG. 4 is a mechanical schematic diagram showing a thermo-mechanical means by which a portion of the mechanism shown in FIG. 3B may be implemented.

Also mentioned, an object of the present invention is to provide low-cost and reliable means for measuring and registering the accumulated flow of thermal energy transport associated with a moving fluid subjected to a temperature change. FIG. 2 illustrates how this may be accomplished using a common fluid flowmetering device 8 consisting of a mechanical fluid displacement detector 9 (which may be of the piston or turbine variety) whose motion is proportional to the flow of the fluid from input port 10 to output port 11. This motion is coupled within the flow meter 8 by shaft 12 to register/display 13 (which may be of the dial or digit counter variety) to indicate accumulated volumetric flow. Such a flowmetering device 8 becomes a thermal energy meter when the temperature change $\Delta T$ experienced by the moving fluid is input by Transducer 14 to proportionally control the operation of the flowmeter 8 by Proportional Controller 15. FIG. 3A, FIG. 3B, and FIG. 4 schematically illustrate mechanical and thermo-mechanical means for a Temperature Transducer 14 and Proportional Controller 15. Note that the required multiplying coefficient $H_v$ may be applied after the meter is read, as is a common practice with electric meters, and therefore no means need be incorporated for doing so within the thermal energy meter itself. A calibrated multiplier constant need only be specified for the meter reader's use.

It is sufficient to proportionally control the flowmeter's register device 13 by Proportional Controller 15. For example, if the fluid experiences no temperature change, then no heat is transferred into or out of it. The Proportional Controller 15 takes the $\Delta T = 0$ from Transducer 14 and does not permit the flowmeter register 13 to be advanced as the fluid flows. If $\Delta T$ becomes non-zero, Proportional Controller 15 allows the percentage of flow registered by register 13 to be increased in proportion to $\Delta T$, so that the incremental amount registered by register/display 13 is proportional to the product of the flow rate and the temperature difference across the system, as desired.

FIG. 3A and FIG. 3B illustrate a mechanical means for Proportional Controller 15. Flowmeter shaft 12 and register 13 are shown in FIG. 3A. However, unlike a common flowmeter, they are not directly connected, but instead the register 13 is driven through a ratchet mechanism 20, whose moving pawl 22 is driven back and forth against ratchet disc 21 which is allowed to rotate in one direction only by stationary pawl 23. Moving pawl 22 is allowed to travel between the limits provided by fixed stop 24 and variable stop 25. The moving pawl 22 is driven against stops 24 and 25 through arm 19 by spring 18, the driven end of which is attached to pin 17 of crank 16, which is turned by shaft 12 of the flowmeter's displacement detector 9 as shown in FIG. 2. The net incremental advance of register 13 is thus proportional to the product of the rate of flow of fluid through the flowmeter times the distance between fixed stop 24 and variable stop 25. Thus, true proportional control is achieved by varying the position of variable stop 25 in proportion to the temperature difference $\Delta T$.

FIG. 4 illustrates schematically a thermo-mechanical transducer means for varying the position of variable stop 25 of FIG. 3B. Two identical bi-metal coils, 26 and 27 are connected mechanically through their centers by thermally insulating shaft 28. Bi-metal coil 26 is in thermal equilibrium with the fluid at one temperature to be measured, while bi-metal coil 27 is in thermal equilibrium with the fluid at the other temperature to be measured. The temperature difference between the two bi-metal coils 26 and 27 is the $\Delta T$ to be measured by the transducer shown by FIG. 4. The outer surface 29 of bi-metal coil 26 is held fixed, while the outer surface 30 of bi-metal coil 27 is free to turn. Because of shaft 28 the central portion of bi-metal coil 27 will turn in proportion to the temperature of bi-metal coil 26. The two bi-metal coils 26 and 27 are wound in the same direction so that the free outer surface 30 of bi-metal coil 27 will turn from its rest position in proportion to the temperature difference $\Delta T$ between bi-metal coil 26 and bi-metal coil 27. In cases where the temperature difference may be taken to be relative to an assumed constant ambient temperature, bimetal coil 26 may be omitted and replaced by a fixed position for shaft 28. This thermal transducer means can be employed to vary the position of variable stop 25 by affixing a suitably-shaped cam 31 to the outer surface 30 of bi-metal coil 27 in such a way that it will rotate about shaft 28 in proportion to the temperature difference $\Delta T$. As the temperature difference $\Delta T$ varies, the working surface of cam 31 will alter the position of variable stop 25 so that the desired proportional control may be obtained. Alternatively, the working surface of cam 31 may be used directly as variable stop 25.

Figure 5:
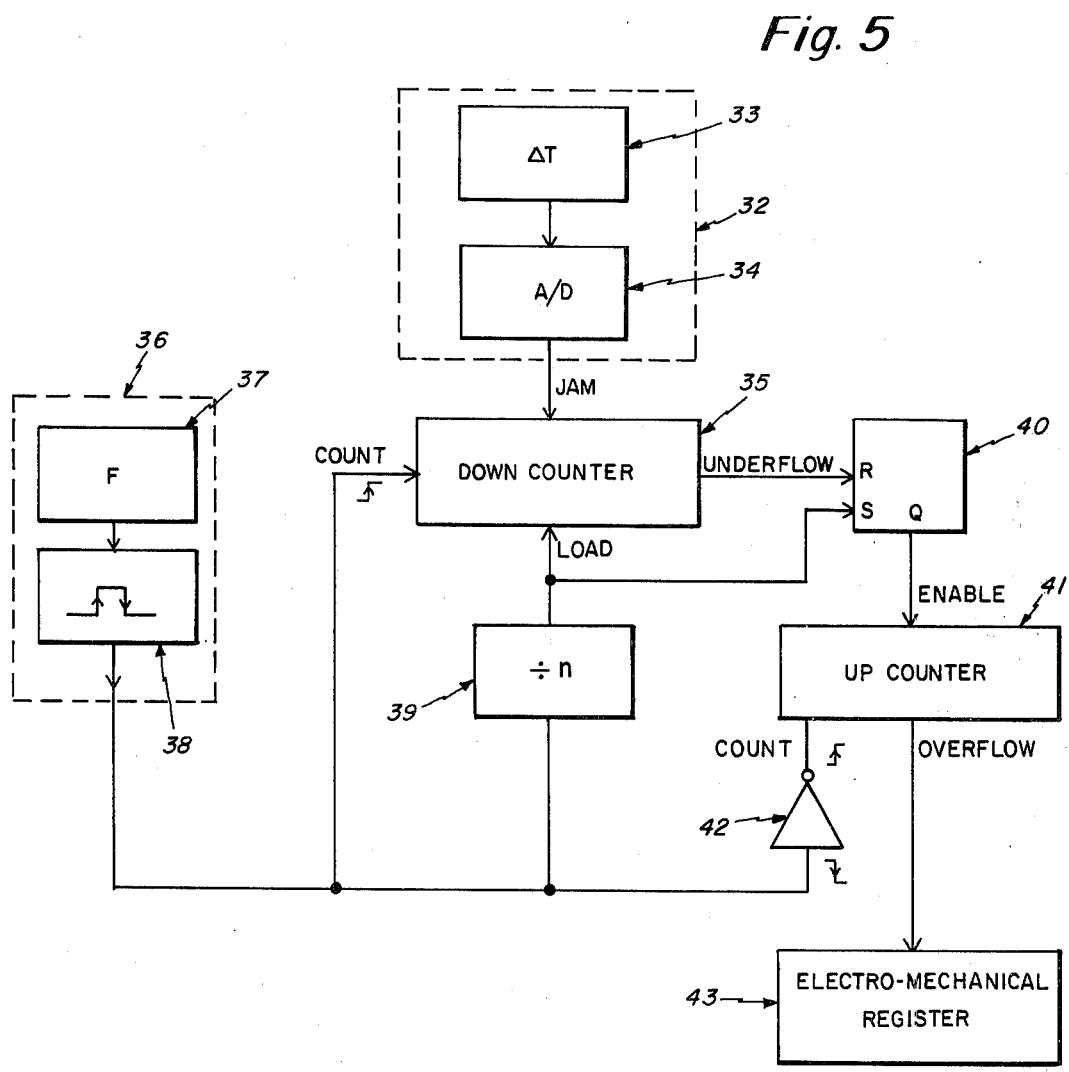
FIG. 5 is a block diagram showing schematically a digital means of implementing a portion of the block diagram of FIG. 2.

FIG. 5 shows in schematic form how a proportional controller means may be implemented digitally. The flowmeter consists of a flow transducer 36, which contains a flow sensor 37 and pulse generator 38 whose pulse rate is proportional to the volumetric fluid flow rate. The temperature transducer 32 consists of $\Delta T$ sensor 33 and analog-to-digital converter 34. The digital output of temperature transducer 32 is proportional to $\Delta T$ and ranges from 0 to $n$, where $n$ is arbitrary. This output appears on the jam inputs of a pre-settable down counter 35. Up counter 41 is used as the accumulator register to contain a reading proportional to the accumulated flow of thermal energy and is enabled to count the pulses from pulse generator 38 only when flip-flop 40 is set. Flip-flop 40 is set every $n$th pulse from pulse generator 38 by Divide-by-$n$ counter 39, which also triggers the loading of the output from temperature transducer 32 into down counter 35. Flip-flop 40 is reset when down counter 35 underflows. Down counter 35 is clocked to count down on the upgoing transition of a pulse from pulse generator 38, while inverter 42 causes the up counter 41 to be clocked to count on the downgoing transition of a pulse from pulse generator 38 so that counter 41 is disabled prior to counting. True proportional control is accomplished as follows: The digital output of temperature transducer 32 is in proportion to the temperature difference $\Delta T$ over the range 0 to $n$, where $n$ is arbitrary. Therefore, every $n$ pulses output from generator 38, counter 41 counts up in proportion to $\Delta T$, and thus for every unit volume of fluid which flows counter 41 is incremented in proportion to the transported thermal energy. If $\Delta T = 0$, down counter 35 underflows immediately and resets flip-flop 40 on the upgoing transition of the first pulse from generator 38 so that up counter 41 is disabled prior to the downgoing transition of the same pulse; thus, under the condition Δt=0, where there is no transported thermal energy, counter 41 will not advance. Circuit types which function in a manner compatible with the block diagram of FIG. 5 are: All counters (including Divide-by-n)—CD4029A; Flip-flop—CD4013A; Inverter—CD4069B. Overflow from counter 41 can be entered into an electromechanical readout register 43 for display of accumulated transported thermal energy.

What is claimed is:

1. A system for measuring and registering an indication of the accumulated flow of thermal energy passing in a fluid line between a heat source and a heat sink, said system having a fluid flow responsive means which rotates a first shaft in proportion to volumetric fluid flow, and arm means responsive to said first shaft rotation, the improvement comprising a differential temperature sensing and responsive means for modifying the motion of said arm means in proportion to the sensed temperature differential, and accumulating and indicating the modified shaft rotation, said differential temperature sensing and responsive means comprising;

first and second temperature-deformable coils which are each independently in thermal equilibrium with the fluid at different temperatures and each of which has an inner and outer end, a common shaft, means for holding the outer end of the first coil fixed, means for spacedly supporting the inner ends of both coils to the common shaft, the outer end of said second coil being free to rotate in proportion to the temperature differential, and means responsive to second coil rotation to motify arm means motion.

2. The system of claim 1 wherein said means responsive to second coil rotation comprises cam means functioning as a stop means for said arm means to limit swinging motion of said arm means.

3. The system of claim 1 wherein said means responsive to second coil rotation comprises a cam which pivots in relation to said common shaft and means for securing the cam to the outer end of the second coil, said cam to be thus rotationally displaced in proportion to the temperature differential.

4. The system of claim 3 including a variable stop means operated by said cam.

5. The system of claim 4 including a fixed stop, said arm means moveable between the fixed and variables stops.

6. A system for measuring and registering an indication of the accumulated flow of thermal energy passing in a fluid line between a heat source and a heat sink, said system having a fluid flow responsive means which rotates a first shaft in proportion to volumetric fluid flow, the improvement comprising a differential temperature sensing and responsive means for modifying the rotation of said first shaft in proportion to the sensed temperature differential, and accumulating and indicating the modified rotation, said means for modifying the rotation of said first shaft from said flow responsive means comprising;

reciprocating arm means, a ratchet means, an output shaft having the modified rotation, pivot means for supporting the arm means and ratchet means, pawl means supported from the arm means for engagement with the ratchet means, means operatively coupled from the first shaft to the end of the arm means to permit reciprocation of the arm means about said pivot means, and means for limiting the travel of said reciprocating arm means in proportion to the sensed temperature differential within the fluid, whereby the rotation of said output shaft is modified rotation of said first shaft, said means operatively coupled including a crank arm turning with said first shaft and a spring connected at one end to the crank arm and at the other end to the arm means.

7. The system of claim 6 wherein said means for limiting includes a pair of stops, the spacing therebetween being a function of said temperature differential and said arm means pivoting with one end thereof in contact with said stops.

8. A system for measuring and registering an indication of the accumulated flow of thermal energy passing in a fluid line between a heat source and a heat sink, said system having a fluid flow responsive means which rotates a first shaft in proportion to volumetric fluid flow, the improvement comprising a differential temperature sensing and responsive means for modifying the rotation of said first shaft in proportion to the sensed temperature differential, and accumulating and indicating the modified rotation, said means for modifying the rotation of said first shaft from said flow responsive means comprising;

reciprocating arm means, a ratchet means, an output shaft having the modified rotation, pivot means for supporting the arm means and ratchet means, pawl means supported from the arm means for engagement with the ratchet means, means operatively coupled from the first shaft to the end of the arm means to permit reciprocation of the arm means about said pivot means, and means for limiting the travel of said reciprocating arm means in proportion to the sensed temperature differential within the fluid, whereby the rotation of said output shaft is modified rotation of said first shaft, first and second temperature-deformable coils which are each independently in thermal equilibrium with the fluid at different temperatures and each of which has an inner and outer end, a common shaft, means for holding the outer end of the first coil fixed, means for spacedly supporting the inner ends of both coils to the common shaft, the outer end of said second coil being free to rotate in proportion to the temperature differential, and means responsive to second coil rotation to control said means for limiting.

* * * * *